United States Patent
Frantz et al.

(10) Patent No.: US 8,463,970 B2
(45) Date of Patent: Jun. 11, 2013

(54) METHOD AND SYSTEM FOR MANAGING SLEEP STATES OF INTERRUPT CONTROLLERS IN A PORTABLE COMPUTING DEVICE

(75) Inventors: Andrew J. Frantz, Boulder, CO (US); Dianne D. Horn, Boulder, CO (US); Joshua H. Stubbs, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 13/069,087

(22) Filed: Mar. 22, 2011

(65) Prior Publication Data
US 2012/0173782 A1 Jul. 5, 2012

Related U.S. Application Data

(60) Provisional application No. 61/429,522, filed on Jan. 4, 2011.

(51) Int. Cl.
*G06F 9/48* (2006.01)
*G06F 1/32* (2006.01)

(52) U.S. Cl.
USPC ............ 710/260; 713/320; 713/323; 713/324

(58) Field of Classification Search
USPC ............................ 710/260; 713/320, 323, 324
See application file for complete search history.

(56) References Cited

U.S. PATENT DOCUMENTS

| 5,905,898 | A | 5/1999 | Qureshi et al. | |
|---|---|---|---|---|
| 6,081,752 | A | 6/2000 | Benson et al. | |
| RE40,236 | E | 4/2008 | Johnson et al. | |
| 7,788,511 | B2 * | 8/2010 | Gary ............................. | 713/300 |
| 7,797,555 | B2 | 9/2010 | Zmudzinski et al. | |
| 2009/0138739 | A1 | 5/2009 | Ginggen et al. | |
| 2009/0144571 | A1 | 6/2009 | Tatsumi | |
| 2009/0259863 | A1 | 10/2009 | Williams et al. | |
| 2010/0325457 | A1 * | 12/2010 | Lachwani et al. ............ | 713/323 |

OTHER PUBLICATIONS

International Search Report and Written Opinion—PCT/US2012/020009—ISA/EPO—Apr. 4, 2012.

* cited by examiner

*Primary Examiner* — Glenn A Auve
(74) *Attorney, Agent, or Firm* — Nicholas A. Cole

(57) ABSTRACT

A method and system for managing sleep states of one or more interrupt controllers of processors contained within a portable computing device are described. The method includes a processor defining wake-up interrupt settings in a storage device contained within the portable computing device. This storage device may comprise message random access memory ("RAM"). After wake-up settings have been established in message RAM, a processor may generate an alert that the wake-up settings in the message RAM have been defined. Next, a controller reviews the wake-up interrupt settings in the message RAM for a plurality of interrupt controllers that correspond with a plurality of processors contained within the portable computing device. The controller merges the wake-up settings in the message RAM and then sends the merged wake-up settings to an always-on power manager ("APM"). The APM is responsible for issuing signals to place interrupt controllers of processors into a sleep state.

40 Claims, 6 Drawing Sheets

_US 8,463,970 B2_

METHOD AND SYSTEM FOR MANAGING SLEEP STATES OF INTERRUPT CONTROLLERS IN A PORTABLE COMPUTING DEVICE

PRIORITY AND RELATED APPLICATIONS STATEMENT

This application claims priority under 35 U.S.C. §119(e) to U.S. Provisional Patent Application Ser. No. 61/429,522, filed on Jan. 4, 2011, entitled "Method and system for managing sleep states of interrupt controllers in a portable computing device." The entire contents of this U.S. Provisional Patent Application are hereby incorporated by reference.

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

PCDs typically have complex and compact electronic packaging that is generally made of multiple processing units that include central processing units, digital signal processors, and the like. Many central processing units ("CPUs") have interrupt controllers ("ICs") as part of their internal make-up. ICs typically gather interrupts together before passing on the signals to a single interrupt pin on the CPU. This may save interrupt pins on the CPU and may also gives flexibility when designing systems. Each IC may have mask and status registers that control the interrupts.

While ICs are useful to CPUs to facilitate multi-tasking, they do present problems when a CPU needs to enter into a low power state. Low power states are also known to one of ordinary skill in the art as a sleep state. Many ICs are not permitted to enter into a sleep state since there usually is not any hardware or software to "wake-up" or activate an IC when it is placed in a sleep state.

Because ICs are usually not put into sleep states, they consume precious power of PCDs. Accordingly, there is a need in the art for providing a method and system that allows ICs to be placed in sleep states so that power for a PCD may be conserved.

SUMMARY OF THE DISCLOSURE

A method and system for managing sleep states of one or more interrupt controllers of processors contained within a portable computing device are described. The method includes a processor defining wake-up interrupt settings in a storage device contained within the portable computing device. This storage device may comprise message random access memory ("RAM"). After wake-up settings have been established in message RAM, a processor may generate an alert that the wake-up settings in the message RAM have been defined. Next, a controller reviews the wake-up interrupt settings in the message RAM for a plurality of interrupt controllers that correspond with a plurality of processors contained within the portable computing device. The controller merges the wake-up settings in the message RAM and then sends the merged wake-up settings to an always-on power manager ("APM"). The APM is responsible for issuing signals to place interrupt controllers of processors into a sleep state. The term "always-on" means that the APM usually receives sufficient and constant power at all times in order to communicate with other devices.

The controller may review a permissions table to determine if a processor has authority to change the state of an interrupt controller for a particular processor. The controller may send the merged wake-up settings to a plurality of registers contained within the APM. The wake-up settings may comprise at least one of an enable setting, a type/detect setting, a polarity setting, a status setting, and a clear setting.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
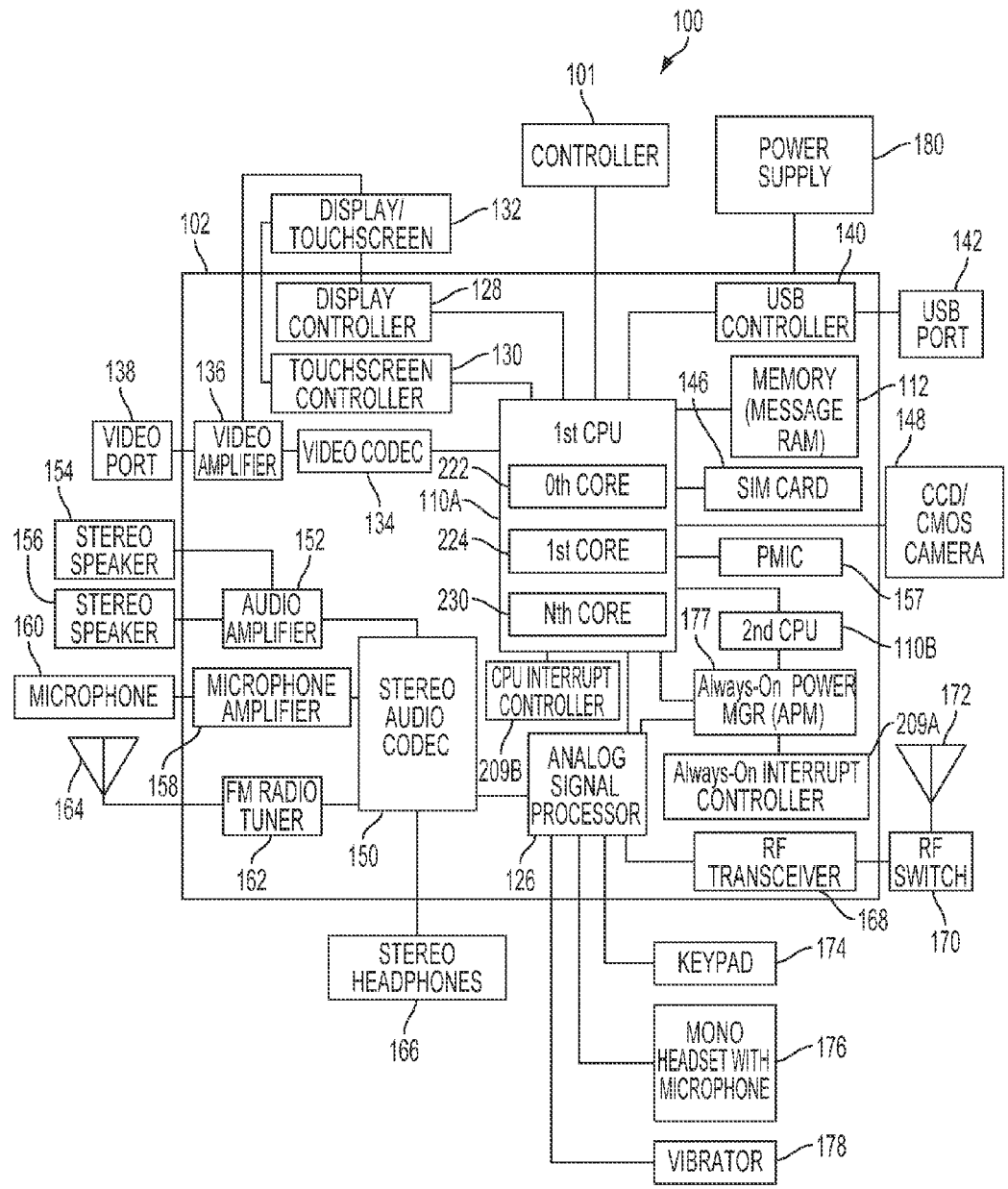
FIG. 1 is a functional block diagram illustrating an embodiment of a portable computing device (PCD)

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") and fourth generation ("4G") wireless technology, greater bandwidth availability has enabled more portable computing devices with a greater variety of wireless capabilities.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology, have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, and a laptop computer with a wireless connection, among others.

FIG. 1: Elements for Managing Sleep States of ICs 209B in PCD 100

Referring to FIG. 1, this figure is a functional block diagram of an exemplary, non-limiting aspect of a PCD 100 in the form of a wireless telephone for implementing methods and systems for managing sleep states of interrupt controllers 209B of the PCD 100. As shown, the PCD 100 includes an on-chip system 102 that includes a multi-core, first central processing unit ("CPU") 110A, a second CPU 110B that is a single-core type, and an analog signal processor 126. These processors 110A, 110B, and 126 may be coupled together. The first CPU 110A may comprise a zeroth core 222, a first core 224, and an Nth core 230 as understood by one of ordinary skill in the art. In an alternate embodiment, two digital signal processors ("DSPs") instead of the two CPUs 110 may also be employed as understood by one of ordinary skill in the art.

FIG. 1 illustrates a PCD 100 that includes a controller 101, a power management integrated circuit ("PMIC") 157, an always-on power manager ("APM") 177, and an always-on interrupt controller ("AIC") 209A with registers. The term "always-on" for the APM 177 and the AIC 209A means that the APM 177 and AIC 209A usually receive sufficient and constant power at all times in order to communicate with other devices.

Figure 2:
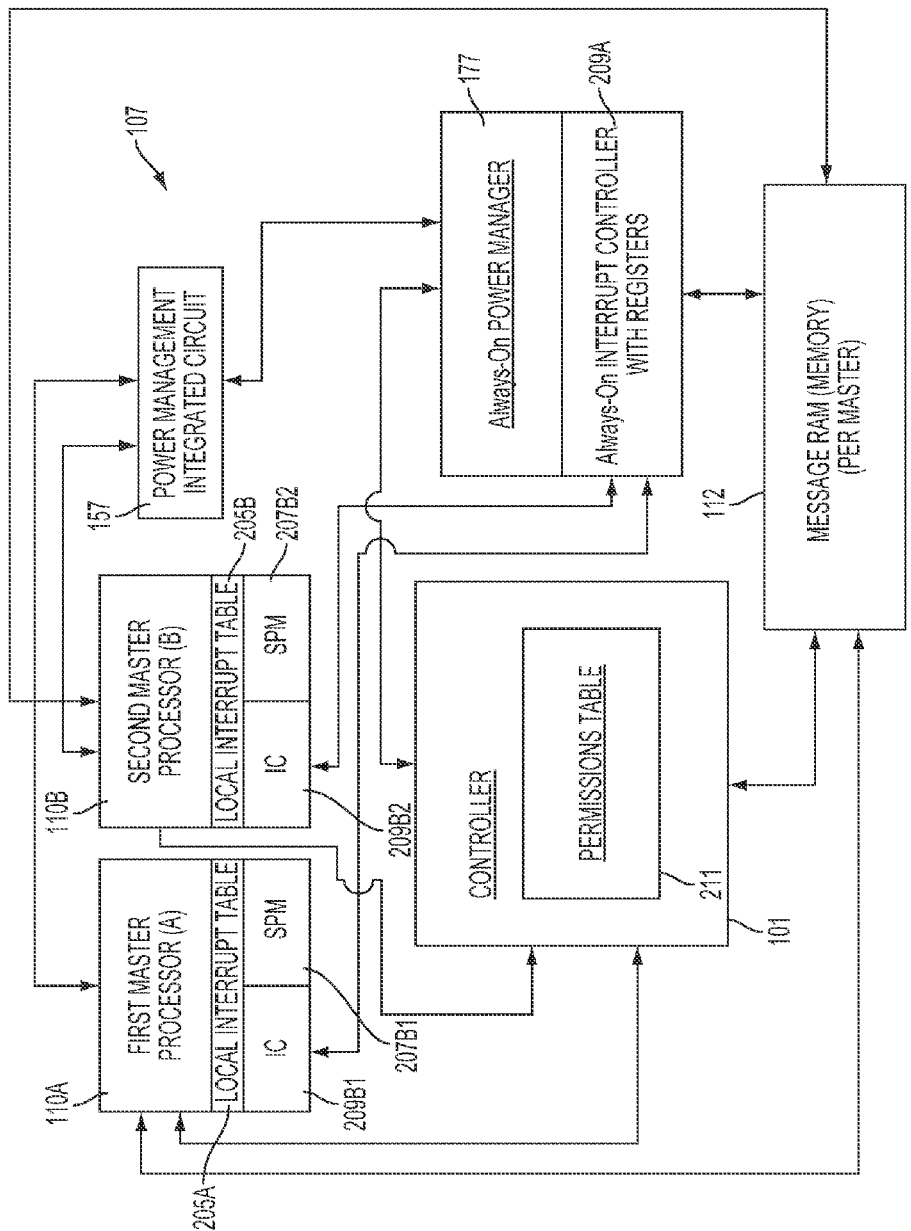
FIG. 2 is a functional block diagram illustrating details of a controller, an always-on power manager, and an always-on interrupt controller.

The PMIC 157 is responsible for turning on and turning off power to processors 110, 126 as well as interrupt controllers 209B in response to control signals received from the always-on power manager 177. Further details of the always-on interrupt controller 209A, the controller 101, and the master processors 110 are illustrated in FIG. 2 and will be described below. The controller 101 and always-on power manager 177 are responsible for managing sleep states for the individual interrupt controllers 209B of each processor 110, 126.

FIG. 1 also shows that the PCD 100 may include memory or message RAM 112. The controller 101 as well the master processors 110, 126 may access the message RAM 112. These devices access the message RAM 112 to manage the sleep states of the ICs 209B in the master processors 110, 126 as will be described below.

In a particular aspect, one or more of the method steps described herein may implemented by executable instructions and parameters stored in the memory 112 that form parts of the controller 101, always-on power manager 177, and always-on interrupt controller 209A. The one or more method steps described herein may also be implemented by executable instructions and parameters that are executed by each of these three elements. While the exemplary embodiments illustrated in the several figures depict several parts of an interrupt controller power system 107 (See FIG. 2) to be embodied in hardware, one of ordinary skill in the art will recognize that the functions and features of these devices may also be implemented in software or a combination thereof.

Parts of the interrupt controller power system 107 (See FIG. 2), that include the controller 101, may be executed by the CPUs 110, the analog signal processor 126, or another processor. Further, the interrupt controller power system 107, the processors, 110, 126, the memory 112, the instructions stored therein, or a combination thereof may serve as a means for performing one or more of the method steps described herein.

FIG. 1: Other Elements of the PCD 100

As illustrated in FIG. 1, a display controller 128 and a touchscreen controller 130 are coupled to the digital signal processor 110. A touchscreen display 132 external to the on-chip system 102 is coupled to the display controller 128 and the touchscreen controller 130.

FIG. 1 is a schematic diagram illustrating an embodiment of a portable computing device (PCD) that includes a video coder/decoder ("codec") 134, e.g., a phase-alternating line ("PAL") encoder, a sequential couleur avec memoire ("SECAM") encoder, a national television system(s) committee ("NTSC") encoder or any other type of video encoder 134. The video codec 134 is coupled to the multicore central processing unit ("CPU") 110. A video amplifier 136 is coupled to the video encoder 134 and the touchscreen display 132. A video port 138 is coupled to the video amplifier 136. As depicted in FIG. 1, a universal serial bus ("USB") controller 140 is coupled to the CPU 110. Also, a USB port 142 is coupled to the USB controller 140. A subscriber identity module (SIM) card 146 may also be coupled to the CPU 110. Further, as shown in FIG. 1, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 180, for example a battery, is coupled to the on-chip system 102. In a particular aspect, the power supply 180 includes a rechargeable DC battery or a DC power supply that is derived from an alternating current ("AC") to DC transformer that is connected to an AC power source.

As depicted in FIG. 1, the touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, power management integrated circuit 157, and the power supply 180 are external to the on-chip system 102.

FIG. 2 is a functional block diagram illustrating details of the interrupt controller power system 107 that may comprise a controller 101, an always-on power manager ("APM") 177, an always-on interrupt controller 209A, a power management integrated circuit ("PMIC") 157, and the message RAM 112. A PCD 100 may have one or more controller module(s) 101.

For the remaining parts of this description, the controller module(s) 101 will be referred to in the singular, as a controller 101, and not plural. One of ordinary skill in the art will recognize that the controller 101 may be divided into various parts and executed by different processors 110, 126 without departing from the invention. Alternatively, the controller 101 may be organized as a single element and executed by a single processor 110 or 126. The controller 101 may also be formed from hardware and/or firmware as understood by one of ordinary skill in the art.

In general, the controller 101 may be responsible for managing sleep states of interrupt controllers 209B that are part of each processor 110. The controller 101 communicates with the always-on power manager 177 and the always-on interrupt controller 209A using registers. The controller 101 maintains a permissions table 211. The permissions table 211 functions to indicate which interrupts in the always-on interrupt controller 209A that the processors 110 are allowed to utilize. This allows the PCD 100 to restrict a processor 110 from using an interrupt source that the processor 110 should not access due to system software ("SW") partitioning as understood by one of ordinary skill in the art.

The always-on power manager 177 may comprise hardware that is used to issue commands to the power management integrated circuit ("PMIC") 157. The PMIC 157 is responsible for powering each individual processor 110. The always-on power manager 177 may be coupled to or the always-on power manager 177 may comprise a plurality of registers. Further details of these registers will be described below in connection with FIG. 3.

The controller 101 makes decisions about the sleep states of the interrupt controllers 209B of each master processor 110. The controller 101 also issues commands to the always-on power manager 177 based on the information contained within the message RAM 112. As illustrated in FIG. 2, the message RAM 112 has memory elements which mirror the registers of the always-on interrupt controller 209A. Details of the message RAM 112 will be described below in connection with FIG. 4. The APM 177 is coupled to and/or the APM 177 may comprise the always-on interrupt controller 209A.

While the exemplary embodiment uses RAM for memory 112, other types of memory devices or a combination of memory devices may be employed for the message RAM 112 as appreciated by one of ordinary skill in the art. Other memory devices include, but are not limited to, dynamic random access memory ("DRAM") "off-chip" 102, static random access memory ("SRAM") "on-chip" 122, cache memory, electrically erasable programmable read only memory ("EEPROM"), etc.

As noted previously, the message RAM 112 may comprise memory elements which mirror the registers of the always-on interrupt controller 209A. Each master processor 110 has a dedicated section or portion of the message RAM 112. Each dedicated section of the message RAM 112 may be written to and read by its assigned master processor 110. The controller 101 may have access to all processor sections of the message RAM 112 and may also have read and write access to these dedicated sections.

As illustrated in FIG. 2, each master processor 110 comprises its own interrupt controller 209B, a subsystem power manager ("SPM") 207, and a local interrupt table 205. Each interrupt controller 209 typically gathers interrupts together before passing on the signals to a single interrupt pin (not illustrated) on the CPU 110. This may save interrupt pins (not illustrated) on the CPU 110 and may also give flexibility when designing systems. Each IC 209 may have mask and status registers (not illustrated) that control the interrupts. Each SPM 207 is responsible for managing power of the hardware present within the processor 110.

The local interrupt table 205 of a CPU 110 comprises always-on power manager ("APM") interrupt values and local interrupt values. Further details about the local interrupt table 205 are described below in connection with FIG. 5.

The APM 177 may be responsible for monitoring and controlling the power to the interrupt controllers ("ICs") 209B of each processor 110 via the PMIC 157. The APM 177 may send control signals to the PMIC 157 to place the ICs 209B of the processors 110 into low power or sleep states as well as bringing the ICs 209 out of sleep states.

Figures 3, 4, 5:
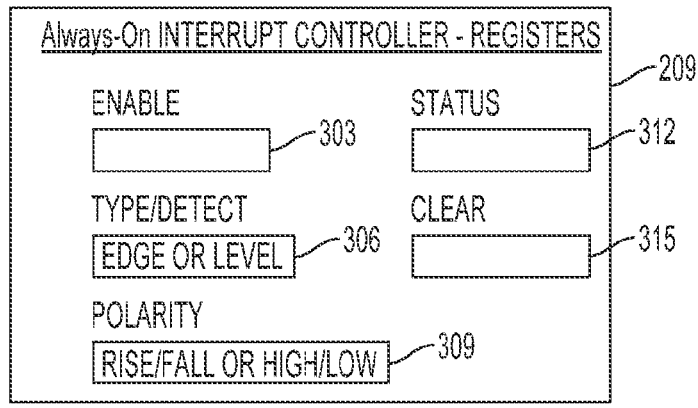
FIG. 3 is a functional block diagram of registers for the always-on interrupt controller of FIG. 2.
FIG. 4 is a functional block diagram of message random access memory.
FIG. 5 is a functional block diagram of a local interrupt table that resides adjacent to a master processor.

FIG. 3 is a functional block diagram of registers for the always-on interrupt controller 209A of FIG. 2. The registers may comprise an enable register 303, a type/detect register 306, a polarity register 309, a status register 312, and a clear register 315. Depending upon the state of the register 303, the enable register 303 activates an interrupt signal that is sent to the always-on power manager 177. The type/detect register 306 identifies the type of a signal detected by the always-on interrupt controller 209A in order to activate an interrupt signal.

The type/detect register 306 may specify one of two types of signals: an edge signal and a level signal. The polarity register 309 may identify a polarity of the signal specified in the type/detect register 306. The polarity register 309 may comprise a rise or fall value if the signal specified in the type/detect register 306 is an edge signal. Alternatively, the polarity register 309 may comprise a high or low value if the signal specified in the type/detect register 306 is a level type signal.

The status register 312 may list which interrupts may have occurred and that have been detected by the always-on interrupt controller 209A. The clear register 315 may cease or stop the tracking of an interrupt signal by the always-on interrupt controller 209A. The controller 101 may write to and read the registers of the always-on interrupt controller 209A. The controller 101 updates the content of these registers based on the information contained within the message RAM 112 as described in further detail in connection with FIG. 4.

FIG. 4 is a functional block diagram of message random access memory ("RAM") 112. The message RAM 112 may comprise memory elements that mirror the registers contained within the always-on interrupt controller 209A. In one exemplary embodiment as illustrated in FIG. 4, each master processor 110 is assigned its own set of registers that mirror those found in the always-on interrupt controller 209A.

Each master processor 110 has an enable memory element 303, a type/detect memory element 306, a polarity memory element 309, a status memory element 312, and a clear memory element 315. The signal profiles contained within the memory elements of the message RAM 112 assigned to each master processor 110 identify the conditions for initiating a sleep state for a particular master processor 110. These signal profiles of each processor section of the message RAM 112 are changeable or adjustable by their assigned master processor 110.

The memory elements of the message RAM 112, also referred to as virtual always-on power manager registers, may also identify the conditions for exiting a sleep state for a particular master processor 110. Each master processor 110 may write to and read the states stored in the memory elements of the message RAM 112.

Exemplary states such as critical, disable, level, edge, high, low, capture, null, and clear are illustrated in message RAM 112 of FIG. 4. However, one of ordinary skill in the art recognizes that these states may be implemented as bits in a binary code. For example, an edge detect state for the type/detect memory element 306 may comprise a binary value of "0b000," while a low detect state for the type/detect memory element 306 may comprise a binary value of "0b010." Other binary values may be employed for each of the detected states that are tracked with memory 112 as understood by one of ordinary skill in the art.

FIG. 5 is a functional block diagram of a local interrupt table 205 that resides adjacent to a master processor 110 as illustrated in FIG. 2 described above. The local interrupt table 205 of each master processor 110 comprises values that translate always-on power manager interrupt values to local interrupt values that are understood by the interrupt controller 209B. These translated values may be passed from a master processor 110 to the always-on power manager 177 via the Message RAM 112.

For example, the first APM value in the table 205 comprises a value of five. The corresponding local interrupt value may comprise a value of 126. Whenever an APM interrupt value of five is passed from the controller 101 to the processor 110, the processor 110 may translate this value to the local interrupt value of 126. The local interrupt value may be passed from the processor 110 to its CPU interrupt controller 209B.

Figure 6:
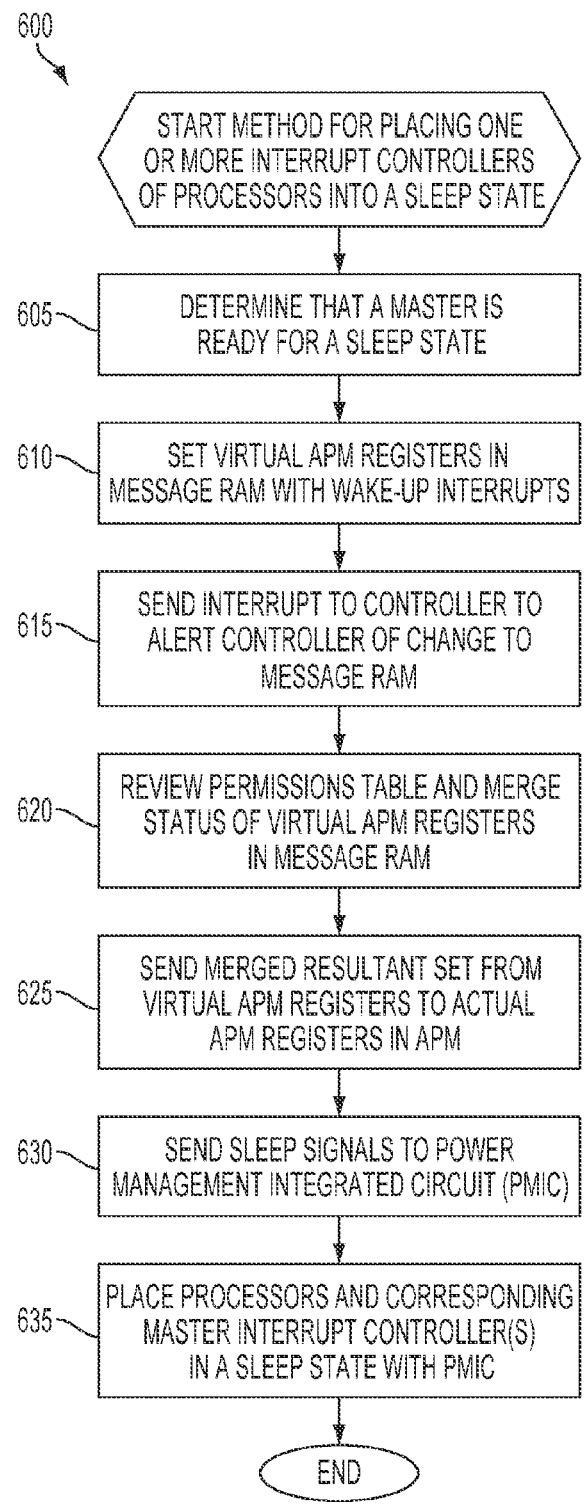
FIG. 6 is a logical flowchart illustrating a method for placing one or more interrupt controllers ("ICs") of multiple CPUs into a sleep state.

FIG. 6 is a logical flowchart illustrating a method 600 for placing one or more interrupt controllers ("ICs") 209B of multiple CPUs 110 into a sleep state. Block 605 is the first step of the method 600. In block 605, a master processor 110 determines that it is ready for entering into a sleep state. A sleep state is also known as a low powered state as understood by one of ordinary skill in the art.

Next, in block 610, a master processor 110 may set or update the values of the virtual always-on power manager registers of the message RAM 112 with its desired interrupt settings for entering into a sleep state. These settings may include the values for the corresponding enable virtual register 303, the type/detect virtual register 306, the polarity virtual register 309, and the clear virtual register 315 as illustrated in FIG. 4.

In block 615, the master processor 110 that just set its values for the virtual always-on power manager registers in the message RAM 112 may send an interrupt signal to the controller 101. This interrupt signal may alert the controller 101 of the changes that the processor 110 has made to its virtual registers in the message RAM 112.

In block 620, the controller 101 reviews the permissions table 211 to determine if the current processor 110 is permitted to change the state of any of the registers in the always-on interrupt controller 209A. Based on this look-up to the permissions table 211, the controller 101 may merge the updates or status of the values in the virtual always-on power manager registers of message RAM 112 together with the values existing in the virtual registers assigned to the other master processors 110. For example, the controller 101 may merge the values of the virtual registers assigned to the first master processor A (110A) with the values of the virtual registers assigned to the second and third master processors B, C (110B, 110C) as illustrated in FIG. 4.

Next, in block 625, the controller 101 may send the merged, resultant set of values from the message RAM 112 to the actual registers in the always-on interrupt controller 209A. In block 630, the always-on power manager 177 reads the updated values of the registers in the always-on interrupt controller 209A and issues corresponding sleep signals to the power management integrated circuit ("PMIC") 157. In block 635, the PMIC 157 changes power delivered to the designated master processors 110 and any corresponding interrupt controllers 209B for placing them into a sleep state. The method 600 then ends.

Figure 7A:
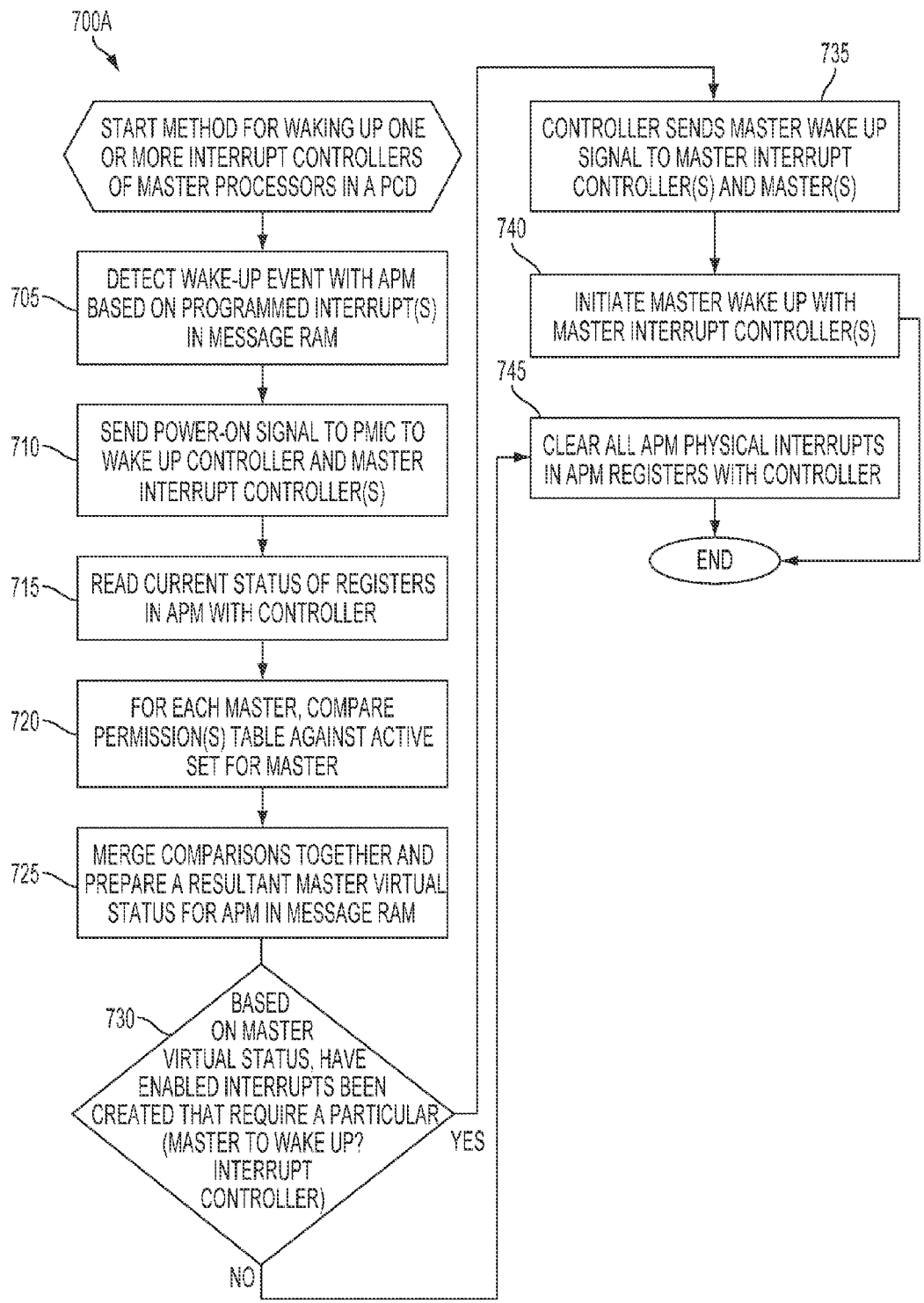
FIG. 7A and FIG. 7B are logical flowcharts illustrating a method for waking up one or more interrupt controllers and multiple master processors from a sleep state.
Figure 7B:
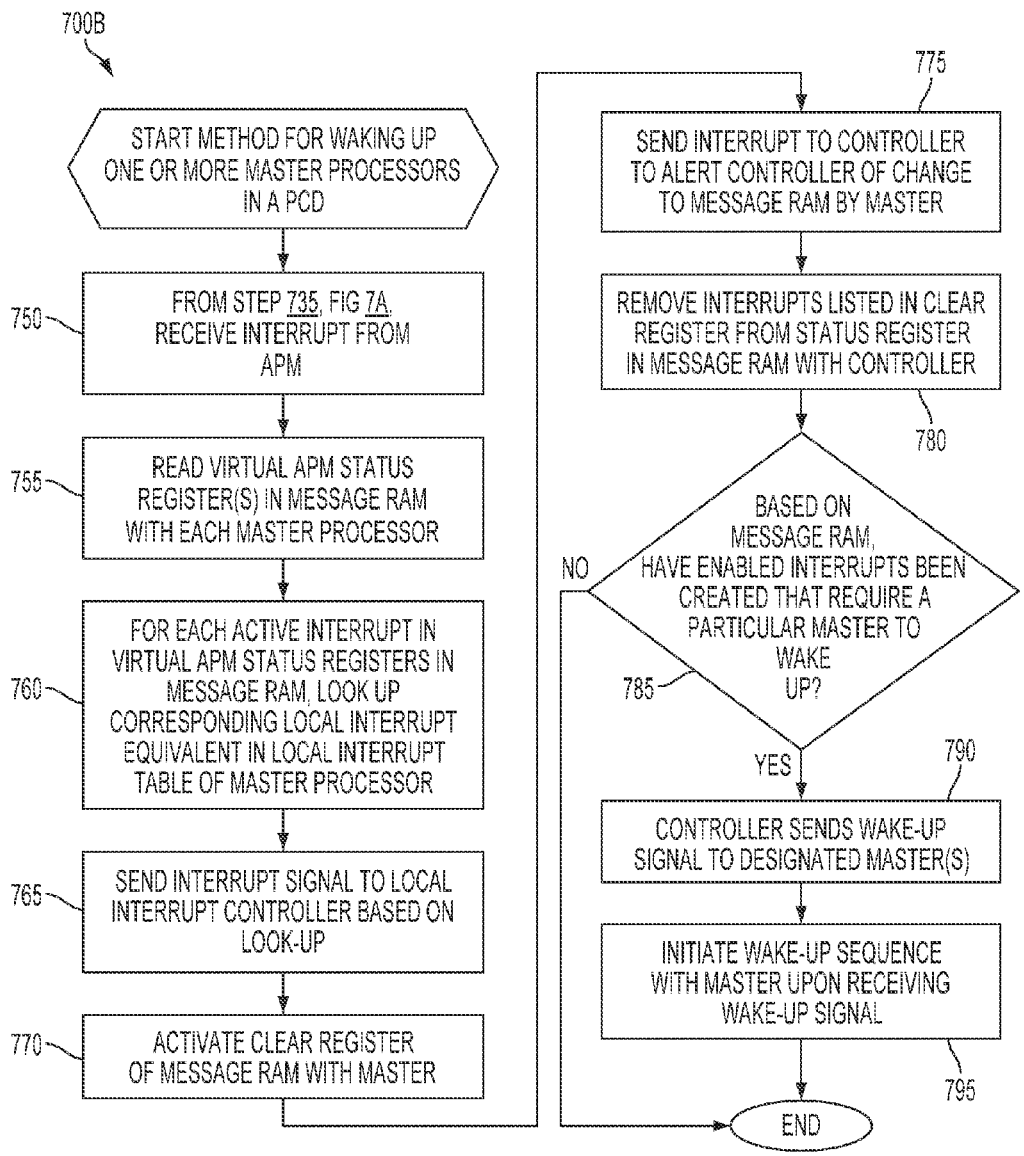

FIG. 7A and FIG. 7B are logical flowcharts illustrating a method 700 for waking up one or more interrupt controllers ("ICs") 209B and multiple master processors 110 from a sleep state. Specifically, FIG. 7A illustrates the portion of method 700 for waking up an interrupt controller 209B from a sleep state. FIG. 7B illustrates the portion of the method 700 for waking up a master processor 110 corresponding to the controller 209B.

Block 705 is the first step of method 700. In block 705, a wake-up event may be detected with the always-on power manager 177 based on the interrupt settings in the registers of the always-on interrupt controller 209A. The settings in the registers of the always-on interrupt controller 209A are a direct result of the merging of these settings listed in the message RAM 112 by the controller 101.

In block 710, a power-on signal is sent to the PMIC 157 to wake up the controller 101 and the master interrupt controller 209A. Next, in block 715, the current status of the registers in the always-on power manager 177 are read with the controller 101. Next, in block 720, for each master processor 110, the controller compares the permissions table 211 against an active set of values assigned to a particular master in the message RAM 112. Next, in block 725, the controller 101 merges the comparisons made in block 720 together and prepares a resultant master processor virtual status for the always-on power manager 177 in the message RAM 112.

In decision block 730, based on the master processor virtual status established in message RAM 112 by the controller 101, the controller 101 determines if enabled interrupts have been created that require a particular master processor 110 to wake-up an interrupt controller 209B that is part of the master processor 110. If the inquiry to decision block 730 is negative, then the "NO" branch is followed to block 745 in which all always-on power manager physical interrupts in the always-on power manager registers of the master interrupt controller 209A are cleared with the controller 101.

If the inquiry to decision block 730 is positive, then the "YES" branch is followed to block 735 in which the controller transmits or sends a master wake-up signal to one or more interrupt controllers 209B and master processors 110. In block 740, each interrupt controller 209 is awakened from its sleep or low power state. After block 740 and after block 745, the method 700 ends.

Referring now to FIG. 7B, this figure illustrates a portion of method 700 for waking up one or more master processors 110 from a sleep or low power state. Block 750 of method 700 may continue after block 735 of FIG. 7A. In block 750, a master processor 110 may receive an interrupt signal from the controller 101 via the CPU interrupt controller 209B.

In block 755, each master processor 110 may read its assigned virtual status registers in the message RAM 112. In block 760, for each active interrupt in the virtual APM status registers in the message RAM 112, a particular master processor 110 will look up the corresponding local interrupt equivalent in the local interrupt table 205 contained within the master processor 110.

Next, in block 765, the master processor 110 will transmit the translated interrupt signal to the local interrupt controller 209B based on the look-up function performed in block 760. In block 770, the master processor 110 issues a command to write the clear register 315 of the message RAM 112 with the value read in block 760.

In block 775, the master processor 110 transmits an interrupt to the controller 101. This interrupt alerts the controller of the change that was made to the message RAM 112 by the master processor 110.

Next, in block 780, the interrupts listed in the clear register 315 are removed from the status register 312 in message RAM 112 by the controller 101. In decision block 785, the controller 101 reviews the status of values in message RAM 112 for each master processor 110. Based on this review of message RAM 112, the controller 101 determines if enabled interrupts have been created that require a particular master processor 110 to wake up from its sleep state.

If the inquiry to decision block 785 is negative, then the "NO" branch is followed in which the process then ends. If the inquiry to decision block 785 is positive, then the "YES" branch is followed to block 790 in which the controller 101 sends a wake-up signal to one or more master processors 110.

In block 795, upon receiving a wake-up signal, each master processor 110 initiates its own wake-up sequence for exiting its sleep state or low powered state. The method 700 then ends.

This interrupt controller power system 107 and methods 600, 700 allows ICs 209B of processors 110 to be placed in sleep states so that power for a PCD 100 may be conserved. The system 107 provides for centralized management of sleep states for a plurality of processors 110 within a PCD 100. By allowing more sleep states for the plurality of processors 110 the average power consumed by PCD 100 be lower than a PCD 100 without the interrupt controller power system 107.

One of ordinary skill in the art will appreciate that certain steps in the processes or process flows described in this specification naturally precede others for the invention to function as described. However, the system and method are not limited to the order of the steps described if such order or sequence does not alter the functionality of the method and system. That is, it is recognized that some steps may performed before, after, or parallel (substantially simultaneously with) other steps without departing from the disclosed system and method.

In some instances, certain steps may be omitted or not performed without departing from the method as understood by one of ordinary skill in the art. Further, words such as "thereafter", "then", "next", etc. are not intended to limit the order of the steps. These words are simply used to guide the reader through the description of the exemplary method.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another.

A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood to one of ordinary skill in the art that various substitutions and alterations may be made therein without departing from disclosed system, and as defined by the following claims.

What is claimed is:

1. A method for managing sleep states of one or more interrupt controllers of processors contained within a portable computing device comprising:

defining wake-up interrupt settings in a storage device contained within the portable computing device;

generating an alert that wake-up settings in the storage device have been defined;

reviewing wake-up interrupt settings in the storage device for a plurality of interrupt controllers that correspond with a plurality of processors contained within the portable computing device;

merging the wake-up settings in the storage device; and sending the merged wake-up settings to a power manager responsible for issuing signals to place interrupt controllers into a sleep state.

2. The method of claim 1, further comprising reviewing a permissions table to determine if a processor has authority to change the state of an interrupt controller.

3. The method of claim 1, further comprising sending the merged wake-up settings to a plurality of registers within the power manager.

4. The method of claim 1, wherein the wake-up settings comprise at least one of an enable setting, a type/detect setting, a polarity setting, a status setting, and a clear setting.

5. The method of claim 1, wherein the storage device comprises memory elements which mirror registers contained within the power manager.

6. The method of claim 1, further comprising relaying signals from the power manager to a power management integrated circuit (PMIC).

7. The method of claim 1, further comprising sending an interrupt signal from the power manager to a processor.

8. The method of claim 1, further comprising reviewing a portion of the storage device assigned to a particular processor for wake-up settings.

9. The method of claim 8, further comprising translating the wake-up settings from the storage device using a local interrupt table.

10. The method of claim 9, further comprising transmitting the translated wake-up settings to an interrupt controller of the particular processor.

11. A computer system for managing sleep states of one or more interrupt controllers of contained within a portable computing device, the system comprising:
a processing element operable to:
define wake-up interrupt settings in a storage device contained within the portable computing device;
generate an alert that wake-up settings in the storage device have been defined;
review wake-up interrupt settings in the storage device for a plurality of interrupt controllers that correspond with a plurality of processors contained within the portable computing device;
merge the wake-up settings in the storage device; and
send the merged wake-up settings to a power manager responsible for issuing signals to place interrupt controllers into a sleep state.

12. The system of claim 11, wherein the processing element is further operable to:
review a permissions table to determine if a processor has authority to change the state of an interrupt controller.

13. The system of claim 11, wherein the processing element is further operable to:
send the merged wake-up settings to a plurality of registers within the power manager.

14. The system of claim 11, wherein the wake-up settings comprise at least one of an enable setting, a type/detect setting, a polarity setting, a status setting, and a clear setting.

15. The system of claim 11, wherein the storage device comprises memory elements which mirror registers contained within the power manager.

16. The system of claim 11, wherein the processing element is further operable to:
relay signals from the power manager to a power management integrated circuit (PMIC).

17. The system of claim 11, wherein the processing element is further operable to:
send an interrupt signal from the power manager to a processor.

18. The system of claim 11, wherein the processing element is further operable to:
review a portion of the storage device assigned to a particular processor for wake-up settings.

19. The system of claim 18, wherein the processing element is further operable to:
translate the wake-up settings from the storage device using a local interrupt table.

20. The system of claim 19, wherein the processing element is further operable to:
transmit the translated wake-up settings to an interrupt controller of a processor.

21. A computer system for managing sleep states of one or more interrupt controllers of processors contained within a portable computing device, the system comprising:
means for defining wake-up interrupt settings in a storage device contained within the portable computing device;
means for generating an alert that wake-up settings in the storage device have been defined;
means for reviewing wake-up interrupt settings in the storage device for a plurality of interrupt controllers that correspond with a plurality of processors contained within the portable computing device;
means for merging the wake-up settings in the storage device; and
means for sending the merged wake-up settings to a power manager responsible for issuing signals to place interrupt controllers into a sleep state.

22. The system of claim 21, further comprising:
means for reviewing a permissions table to determine if a processor has authority to change the state of an interrupt controller.

23. The system of claim 21, further comprising:
means for sending the merged wake-up settings to a plurality of registers within the power manager.

24. The system of claim 21, wherein the wake-up settings comprise at least one of an enable setting, a type/detect setting, a polarity setting, a status setting, and a clear setting.

25. The system of claim 21, wherein the storage device comprises memory elements which mirror registers contained within the power manager.

26. The system of claim 21, further comprising:
means for relaying signals from the power manager to a power management integrated circuit (PMIC).

27. The system of claim 21, further comprising:
means for sending an interrupt signal from the power manager to a processor.

28. The system of claim 21, further comprising:
means for reviewing a portion of the storage device assigned to a particular processor for wake-up settings.

29. The system of claim 28, further comprising means for translating the wake-up settings from the storage device using a local interrupt table.

30. The system of claim 29, further comprising:
means for transmitting the translated wake-up settings to an interrupt controller of the particular processor.

31. A non-transitory processor readable storage medium having stored thereon processor-executable instructions configured to cause a processor to perform operations for managing sleep states of one or more interrupt controllers of processors contained within a portable computing device, said operations comprising:
defining wake-up interrupt settings in a storage device contained within the portable computing device;
generating an alert that wake-up settings in the storage device have been defined;

reviewing wake-up interrupt settings in the storage device for a plurality of interrupt controllers that correspond with a plurality of processors contained within the portable computing device;

merging the wake-up settings in the storage device; and sending the merged wake-up settings to a power manager responsible for issuing signals to place interrupt controllers into a sleep state.

32. The non-transitory processor readable storage medium of claim 31, wherein the stored processor-executable instructions are configured to cause the processor to perform operations further comprising:

reviewing a permissions table to determine if a processor has authority to change the state of an interrupt controller.

33. The non-transitory processor readable storage medium of claim 31, wherein the stored processor-executable instructions are configured to cause the processor to perform operations further comprising:

sending the merged wake-up settings to a plurality of registers within the power manager.

34. The non-transitory processor readable storage medium, wherein the wake-up settings comprise at least one of an enable setting, a type/detect setting, a polarity setting, a status setting, and a clear setting.

35. The non-transitory processor readable storage medium, wherein the storage device comprises memory elements which mirror registers contained within the power manager.

36. The non-transitory processor readable storage medium of claim 31, wherein the stored processor-executable instructions are configured to cause the processor to perform operations further comprising:

relaying signals from the power manager to a power management integrated circuit (PMIC).

37. The non-transitory processor readable storage medium of claim 31, wherein the stored processor-executable instructions are configured to cause the processor to perform operations further comprising:

sending an interrupt signal from the power manager to a processor.

38. The non-transitory processor readable storage medium of claim 31, wherein the stored processor-executable instructions are configured to cause the processor to perform operations further comprising:

reviewing a portion of the storage device assigned to a particular processor for wake-up settings.

39. The non-transitory processor readable storage medium of claim 38, wherein the stored processor-executable instructions are configured to cause the processor to perform operations further comprising:

translating the wake-up settings from the storage device using a local interrupt table.

40. The non-transitory processor readable storage medium of claim 39, wherein the stored processor-executable instructions are configured to cause the processor to perform operations further comprising:

transmitting the translated wake-up settings to an interrupt controller of the particular processor.

* * * * *